J. LEONARD & W. J. OLDAKER.
PHOTOGRAPHIC APPARATUS.
APPLICATION FILED SEPT. 24, 1907.
967,025.
Patented Aug. 9, 1910.
2 SHEETS—SHEET 1.
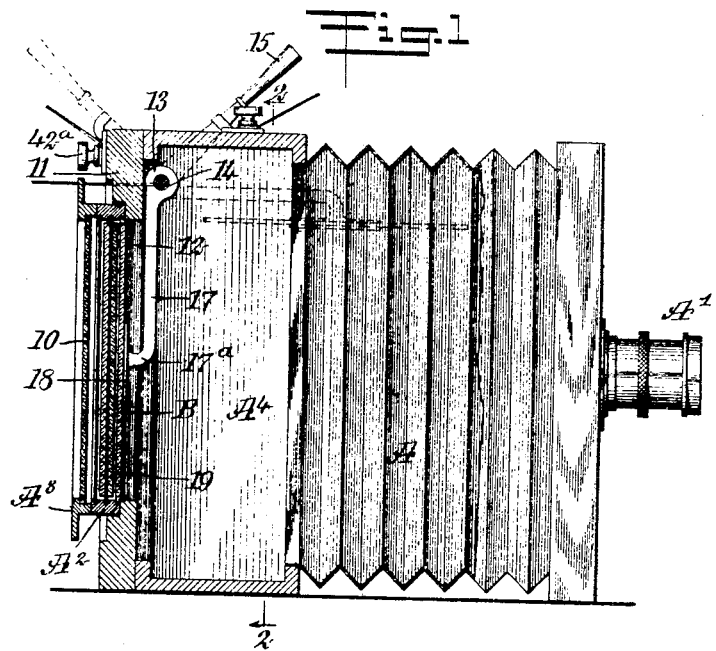
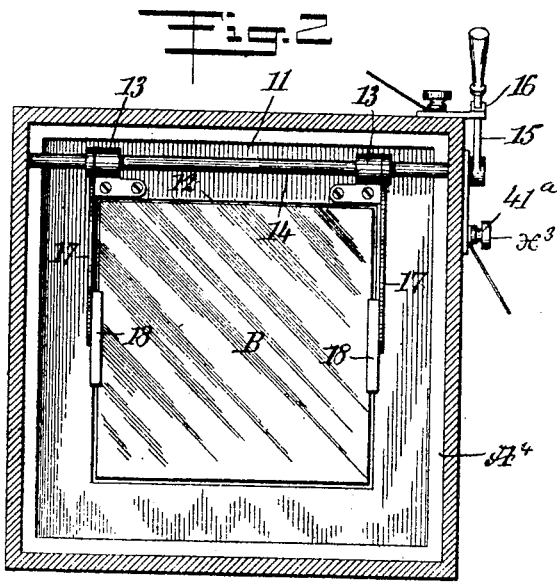
WITNESSES
INVENTORS
John Leonard
William J. Oldaker
BY
ATTORNEYS J. LEONARD & W. J. OLDAKER.
PHOTOGRAPHIC APPARATUS.
APPLICATION FILED SEPT. 24, 1907.
967,025.
Patented Aug. 9, 1910.
2 SHEETS—SHEET 2.
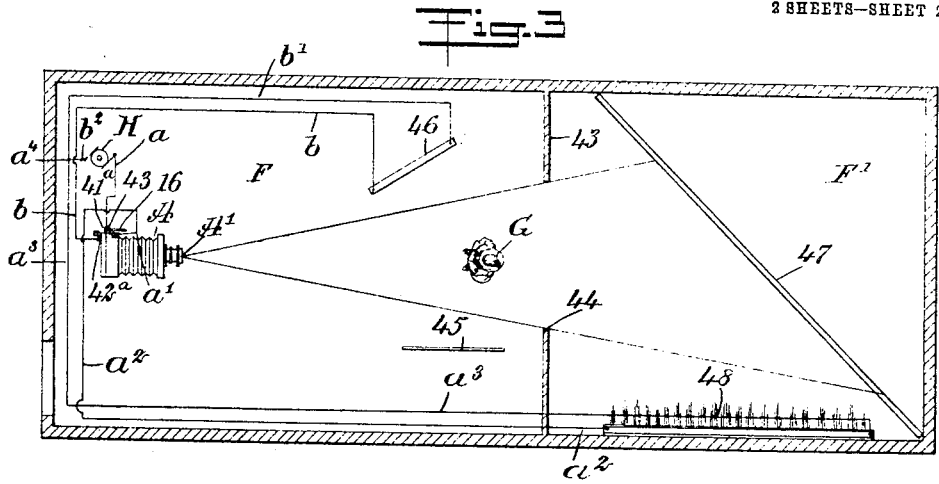
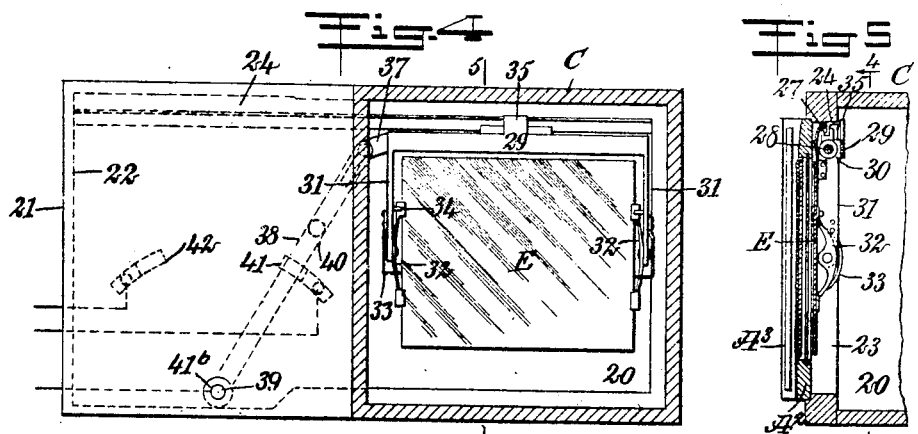
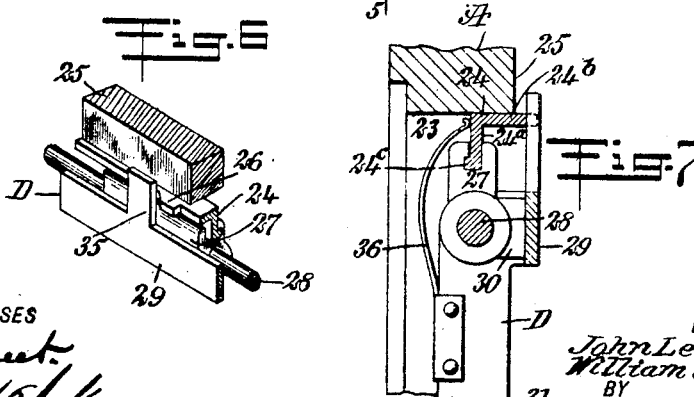
WITNESSES
INVENTORS
John Leonard
William J. Oldaker
BY
ATTORNEYS

UNITED STATES PATENT OFFICE.

JOHN LEONARD AND WILLIAM J. OLDAKER, OF CHICAGO, ILLINOIS.

PHOTOGRAPHIC APPARATUS.

967,025.   Specification of Letters Patent.   Patented Aug. 9, 1910.

Application filed September 24, 1907. Serial No. 394,275.

*To all whom it may concern:*

Be it known that we, JOHN LEONARD and WILLIAM J. OLDAKER, citizens of the United States, and residents of Chicago, in the county of Cook and State of Illinois, have invented a new and useful Improvement in Photographic Apparatus, of which the following is a full, clear, and exact description.

The purpose of this invention is to provide a novel apparatus wherein provision is made for introducing into a photograph at the time of exposing the sensitized plate, a background or companion subject to the actual subject being photographed, which added subject or subjects are not actually present or accessible, and further, to accomplish the result in such manner that the finished photograph will present a single, compact, and natural picture which will appear as if the principal subject had been photographed together with and in the actual presence of the subjects thus introduced.

It is a further purpose of the invention to provide a simple and readily operated apparatus of the character indicated.

The invention consists in the novel construction and arrangement of parts as hereinafter described and pointed out in the claims.

Reference is to be had to the accompanying drawings forming a part of this specification, in which similar characters of reference indicate corresponding parts in all the figures.

Figure 1 is a sectional side elevation of a camera having the necessary attachment applied; Fig. 2 is a vertical section taken practically on the line 2—2 of Fig. 1; Fig. 3 is a diagrammatical view of a chamber or operating room rendered necessary by the method employed; Fig. 4 is a transverse section through a camera box having a sight extension at its rear appearing in front elevation and illustrating a modified form of the attachment, the section being taken practically on the line 4—4 of Fig. 5; Fig. 5 is a longitudinal vertical section taken practically on the line 5—5 of Fig. 4; Fig. 6 is an enlarged perspective detail view of parts of the transparency frame and its carriage shown in Figs. 4 and 5; and Fig. 7 is an enlarged section through the upper rear portion of the camera box, the carriage, and the frame that supports the transparency frame.

A represents a camera of any improved type provided with the customary lens $A'$, and $A^2$ represents the plate holder, and $A^3$ the customary retainer for the plate holder. This camera is provided with the usual single lens chamber $A^4$ and the retainer $A^3$ carries the usual ground glass 10, as is illustrated in Fig. 1. At the inner face of the upper member 11 of the back, or that member which is above the rear opening 12 at which the exposure of the plate is made, are attached bearings 13 of any approved type, and in said bearings a shaft 14 is mounted to turn. One end of the shaft 14 is carried out beyond the side of the camera box, as is clearly shown in Fig. 2, and a lever 15 is secured to the outer end of the said shaft 14; this lever is adapted to swing to and from engagement with a contact plate 16 that is attached in any approved manner to the upper face of the camera box at the rear, and the said lever is adapted to effect an electrical connection in such manner as to serve as a switch for controlling electric currents.

Arms 17 are made fast to the shaft 14 within the lens chamber and the arms extend normally downward from the said shaft 14, but outside of the aforesaid exposure opening 12, as is shown in Fig. 2, and at the lower end $17^a$ of each of the said arms 17, a spring clip 18 is attached, of such character that the said clips may receive and so engage with the side edges of a subject plate B, as to hold the said plate firmly in desired position. The subject plate B is of the same size as the sensitized plate 19 that is exposed, and the said subject plate B must be in the nature of a transparent positive of the subject to be included in the photograph. When the principal subject is to be photographed, the lever or switch 15 is carried to the rear, as is shown in dotted lines in Fig. 1, which brings the subject plate B to the upper horizontal position shown in dotted lines in Fig. 1, and then the sensitized plate is exposed in the usual manner. After such an exposure of the principal object under conditions to be hereinafter described, the subject plate is brought down and made to cover the sensitized plate upon which the principal object was depicted, and then the subjects on the subject plate will be depicted also on the sensitized plate in proper form.

In Figs. 4, 5, 6, and 7, we have illustrated another form of apparatus, wherein the camera C is provided with the usual lens chamber 20, but is also provided at one side of the rear portion with an extension 21 of the same cross sectional dimensions as the said camera proper, and in the extension 21, a light-tight chamber 22 is produced, which chamber 22 is in communication with the chamber 20 of the camera. A track 24 is placed in engagement with the upper wall of an opening 23 at the back of the camera at which the plate is exposed, and this track 24 extends from side to side of the lens chamber 20 and likewise from side to side of the chamber 22 in the extension 21. The track 24 consists of a downwardly extending suspension member 24$^a$, an upper horizontal flange 24$^b$, and a lower narrower flange 24$^c$. The upper flange 24$^b$ is attached in any suitable or approved manner to the said upper wall of the opening 23 and extends forwardly a slight distance beyond the forward face of the upper member of the back of the camera, as is shown in Fig. 7, while the lower flange 24$^c$ extends rearwardly, rendering the lower portion of the track more or less L-shaped, and at that portion of the track which is adjacent the center of the lens chamber 20, a cam offset 26 is formed, best shown in Fig. 6, and the said cam has an inclined wall that faces the side of the camera at which the extension is located. The track 24 is adapted at its lower end to enter a correspondingly formed longitudinal slot in a carriage block 27, and this carriage block 27 is adapted to slide on the said track, being capable of moving into either chamber 20 or 22. A rod or bar 28 is passed through the said block 27 and is fast thereto, and the rod 28 extends beyond the ends of the said carriage block and is slightly longer than the width of the opening 23 at the back of the camera. In addition to the carriage block and its bar 28, a plate sustaining frame D is employed, which plate sustaining frame D consists of an upper transverse member 29 having rearwardly extending ears 30 at its ends, which ears are pivotally mounted on the end portions of the rod or bar 28, and from the said ears 30, side members 31 are carried downward, as is best shown in Figs. 4 and 7. A clip 32 is pivoted at its center upon the lower end portion of each arm 31 at the inner faces of said arms, as is best illustrated in Figs. 4 and 5. These clips are of such construction that they may readily grip the side edges of an object or transparency plate E, the equivalent of the plate B, heretofore referred to, and these clips are held in such position as to hold the plate E engaged thereby in a perfectly vertical position, so that the said plate may be brought close to and be spaced an equal distance from a sensitized plate being exposed. This is accomplished by attaching springs 33 to the outer or side faces of the arms 31, and carrying the lower portions of said springs to an engagement with the forward edges of the clips adjacent their lower ends, the upper end portions of the forward edges of the said clips being pressed by said springs to an engagement with pins 34, that extend from the inner faces of said arms, as is particularly shown in Fig. 4. The upper member 29 of the plate sustaining frame D is provided with an upwardly extending lug 35, which is carried up sufficiently high to travel along the forward edge of the track 24, and when the lug 35 engages with the cam 26 on the track 24, as is shown in Fig. 6, the lower portion of the plate sustaining frame is rocked forward so as to bring the transparency plate E as close as possible to the sensitized plate in the plate holder. Springs 36 are secured to the rear edges of the arms 31 of the plate sustaining frame D, and these springs 36 extend up to a bearing against the rear portion of the track 24, as is shown in Fig. 7, and the said springs serve to restore the plate sustaining frame D to its normal position after the projection 35 therefrom has passed the cam projection 26. One end of the rod 28 of the carriage block 27 is connected by a link 37 with the upper end of a lever 38 that is located in the light-tight chamber 22 of the extension, being secured to a rocker arm 39 located in the bottom of the said chamber 22, which rocker arm passes out at the back of the said extension and has attached to its outer end a hand lever 40, which extends in parallel relation with the lever 38 and serves as a switch to control an electric current, and is the equivalent of the lever 15, shown in Figs. 1 and 2. The switch 40 is adapted to engage with either one of two electric contacts 41 and 42, between which the said switch has movement, as is shown in dotted lines in Fig. 4. The contact point 41 is the equivalent of the contact 16 shown in Figs. 1 and 2, and the contact 42 is the equivalent of a contact 42$^a$ shown in said Fig. 1, and a third contact is provided in each form of the camera, which third contact in the form of camera shown in Figs. 1 and 2, is designated as 41$^a$, and is connected with the shaft 14 carrying the switch 15, while the third contact in the construction shown in Fig. 4, is designated as 41$^b$, and is connected with the switch provided for said camera.

In Fig. 3 we have shown a diagram of the arrangement of the studio or operating chamber, which is divided into two compartments, F and F′, by a partition 43 having an opening 44 therein. The camera A is suitably mounted in the compartment F in such manner that its lens will face the opening 44, and the subject G to be photographed is also placed in the compartment F in front of said opening 44. At one side of the subject, also within the compartment F, is placed a reflector 45, while at the opposite side of the subject, a source of light 46 is located for the purpose of illuminating the subject G. The opening 44 in the partition 43 is preferably square and is large enough to permit a plain point background 47, located in the compartment F, to be viewed upon the ground glass of the camera. The background 47 is inclined away from the said opening 44, and at one side of the compartment F' a second source of light 48 is located, in such manner as to illuminate the face of the background that is presented to the camera. The two sources of light 46 and 48 may be any electric light suitable for photography, that can be quickly manipulated, and must be connected with the switch of the camera in such a way that when one is luminous the other is extinguished, and the sources of light must be arranged with relation to the partition 43, in such a way that one compartment is always in darkness while the other is illuminated. By employing clips as holders for the transparency or object plate, the plates may be readily changed at the option of the operator.

The lights are energized from one source of electricity or dynamo H, for example, and both sources of light are in circuit connection with the said source of power, and either circuit is opened or closed by the action of the switch on the camera, one circuit being closed as the other is opened. The circuit for the light 48 is indicated by the wire $a$ that leads from the source of power to the contact 15, and then through the wire $a'$ to a supply wire $a^2$ that is carried through the light, and a return wire $a^3$ that is carried up to a junction $a^4$ with the said source of electric supply. The circuit for the light 46 is indicated by the wire $b$, which extends from the source of power to the contact 42$^a$, and from thence to the light 46 and through the same, and a return wire $b'$ that is carried to the junction $a^4$ and connected by a wire $b^2$ with the said source of electric power, as is also shown in Fig. 3.

The general operation of the device is as follows: Supposing the camera shown in Fig. 1 to be used, the switch 15 is swung to the dotted position shown in Fig. 1, which will carry the transparency or object plate B to the upper position shown in dotted lines in the same figure, out of view when focusing on the ground glass of the camera, and the shifting of the switch 15 also causes a break in the circuit to the light 48 and closes the circuit to the light 46, whereby the subject is illuminated to permit focusing in the usual way. Then the switch is reversed and the transparency is swung in front of the ground glass to ascertain if the image of the main subject is in harmony with the picture in the transparency, if so the transparency is returned to its first position, the plate holder is inserted in the camera, the slide is removed and exposure of the subject is made in the usual way. Then, instantly, while the shutter is still open and the subject is in position, the switch 15 is reversed, breaking the circuit of the light 46 and closing that of the light 48, and the transparency E is at the same time brought to a contact with the exposed plate in the holder. The compartment F will now be dark, while the light 48 in the compartment F' will be reflected from the background 47, and will pass through the lens and transparency and transfer the photograph thereon to the sensitized plate, except where the light was obstructed by the body of the main object. Since the background was in darkness during the first exposure, only that part of the plate covered by the image of the subject will have been exposed, and as the subject was in darkness during the second exposure, only that part not covered by the image of the subject will have been exposed, therefore, if the picture on the transparency was of a suitable nature and properly made and the exposure correctly timed, the resulting picture will be good, and the picture of the main object will appear naturally with the surroundings.

Having thus described our invention, we claim as new and desire to secure by Letters Patent,—

1. In an apparatus for taking pictures, the combination with a camera, of a holder for a transparent positive located between the lens and plate holder of the camera, and means for moving the holder carrying the positive to a position so that the positive will cover a plate in the plate holder or to a position so that the positive will be out of the focal plane of the lens.

2. In an apparatus for taking pictures, the combination with a camera, of a pivoted holder for a transparent positive located between the lens and plate holder of the camera, and means exterior of the camera for operating the holder carrying the positive, whereby the positive may be made to cover a plate in the plate holder or assume a position out of the focal plane of the lens.

3. The combination of a camera, its plate holder and lens, a holder for a transparency removable to and from a position in front of the plate holder, and located between the plate holder and the lens, an electrically operated illuminating member, a circuit for energizing the same, a second electric illuminating member, a circuit for energizing the latter, a source of electricity, and means controlled by the operator for shifting the current from said source, first through one of said circuits and then through the other, and devices whereby said means also operate the said transparency holder.

4. In a photographic apparatus, the combination of a camera, a movable holder for a transparent positive located between the lens and plate holder of the camera, an illuminating device, and means for operating the said holder and controlling the illuminating device.

5. In a photographic apparatus, the combination of a camera, a movable transparency holder located between the lens and plate holder of the camera, an electric circuit, lights in the circuit, and a lever for operating the said holder, said lever serving as a switch for controlling the electric current.

6. In a photographic apparatus, a camera having a holder for a transparent positive arranged between the lens and plate holder, an electric circuit, lights in the circuit, and means for operating the holder and controlling the lights, whereby the lights will be alternately lighted and extinguished when the transparent positive is moved from one position to the other 7. In a photographic apparatus, a chamber divided into two compartments by a partition having an opening therein, a camera in one compartment and having a holder for a transparent positive arranged between the lens and plate holder, a reflector in the compartment with the camera adjacent to the opening of the partition, an inclined background in the other compartment, an electric circuit, lights in the circuit, one in each compartment, and means for operating the said holder and alternately lighting and extinguishing the lights.

In testimony whereof we have signed our names to this specification in the presence of two subscribing witnesses.

JOHN LEONARD.
WILLIAM J. OLDAKER.

Witnesses:
HARRY L. REPERELL,
JAS. B. BITTENBENDER.